(12) United States Patent
Mitrani et al.

(10) Patent No.: US 6,958,977 B1
(45) Date of Patent: Oct. 25, 2005

(54) NETWORK PACKET TRACKING

(75) Inventors: Roee Mitrani, Haifa (IL); Lior Horn, Haifa (IL); Uri Keidar, Haifa (IL); Moshe Sidi, Haifa (IL); Israel Cidon, Haifa (IL)

(73) Assignee: Viola Networks LTD, Yokneam Illit (IL)

( * ) Notice: Subject to any disclaimer, the term of this patent is extended or adjusted under 35 U.S.C. 154(b) by 798 days.

(21) Appl. No.: 09/587,913

(22) Filed: Jun. 6, 2000

(51) Int. Cl.[7] ............................................. H04L 12/26
(52) U.S. Cl. ...................................... 370/252; 709/224
(58) Field of Search ............................... 370/241, 248, 370/249, 252, 400, 231, 235, 251; 709/223, 709/224

(56) References Cited

U.S. PATENT DOCUMENTS

| | | | |
|---|---|---|---|
| 5,477,531 A | | 12/1995 | McKee et al. ................. 370/17 |
| 5,634,009 A | | 5/1997 | Iddon et al. ............ 395/200.11 |
| 5,648,965 A | * | 7/1997 | Thadani et al. .............. 370/241 |
| 5,812,528 A | * | 9/1998 | VanDervort .................. 370/235 |
| 5,812,529 A | | 9/1998 | Czarnik et al. .............. 370/245 |
| 5,838,919 A | | 11/1998 | Schwaller et al. ...... 395/200.54 |
| 5,881,237 A | | 3/1999 | Schwaller et al. ...... 395/200.54 |
| 6,006,268 A | * | 12/1999 | Coile et al. .................. 709/227 |
| 6,115,751 A | * | 9/2000 | Tam et al. .................... 709/240 |
| 6,327,620 B1 | * | 12/2001 | Tams et al. .................. 709/224 |
| 6,363,053 B1 | | 3/2002 | Schuster et al. ............. 370/230 |
| 6,397,359 B1 | * | 5/2002 | Chandra et al. ............. 714/712 |
| 6,618,389 B2 | | 9/2003 | Hoefelmeyer et al. |
| 6,622,157 B1 | * | 9/2003 | Heddaya et al. ............. 709/202 |
| 6,700,891 B1 | * | 3/2004 | Wong .......................... 370/401 |
| 6,738,349 B1 | * | 5/2004 | Cen ............................. 370/231 |

OTHER PUBLICATIONS

Stalins, W. "SNMP, SNMPv2, SNMPv3, and RMON 1 and 2" "Practical Network Management." Addison-Wesley, Third Edition, 1996 pp163-192.

* cited by examiner

*Primary Examiner*—Man U. Phan
*Assistant Examiner*—Toan Nguyen
(74) *Attorney, Agent, or Firm*—Ladas & Parry LLP

(57) ABSTRACT

A method for testing of a communication network having a plurality of end-points, using one or more network agents coupled to the network at respective locations. The method includes specifying at least one packet filtering criterion, and transmitting one or more data packets meeting the at least one criterion through the network from one of the end-point to another. At least one of the data packets meeting the criterion is intercepted using the network agents at one or more of the respective locations in the network traversed by the at least one of the data packets. Information regarding the at least one intercepted packet at the one or more respective locations is recorded and processed to analyze a route of the at least one intercepted packet through the network.

25 Claims, 2 Drawing Sheets

NETWORK PACKET TRACKING

FIELD OF THE INVENTION

The present invention relates generally to communication networks, and specifically to testing and fault discovery in communication networks.

BACKGROUND OF THE INVENTION

Communication networks are in wide use in many technological fields including distributed computing, data exchange and telecommunication applications. Communication networks generally include many nodes, such as bridges, LAN switches, routers, cross-connections and telephone switches. The networks further include communication links, such as cables, point-to-point radio connections and optical fibers, which connect the nodes. The networks also include ports, generally within some of the nodes, for attaching external devices such as computers, terminals, handsets, and multiplexers. These external devices are referred to as end-points, or hosts.

A major issue in both newly-deployed and existing communication networks is testing and trouble-shooting, i.e., checking whether the network is operating according to its specifications and, if not, determining the cause of the network's inadequate performance (for example, the identity of a faulty unit or link). Dedicated point-to-point testing equipment is a commonly-used network testing tool. Such equipment is described, for example, in U.S. Pat. No. 5,477,531, whose disclosure is incorporated herein by reference. Usually, dedicated point-to-point testing equipment requires two users to coordinate their operations in order to identify a misbehaving component of the network. To test a large network, the testing equipment must be moved between many ports of the network.

End-to-end tests of network response times and delays provide useful information regarding the operational status of the network. Such tests are helpful in determining that a fault or network overload has occurred. For example, in end-to-end timing testing, packets of a given size are sent from a source node to a destination node, which measures and reports the packet arrival times. In response time testing, the destination node sends a correlated echo packet back to the source, which measures and reports the round-trip time elapsed between sending the original packet and receiving the echo packet. When there is excessive delay or jitter in delivery of the packets, it is an indication that a problem exists. End-to-end tests by themselves, however, provide no further information as to the source and location of the problem within the network.

RMON (Remote Network Monitoring) is a family of standards defining information that a network administrator can use to monitor, analyze, and troubleshoot a distributed network from a central site. These standards, which are an extension of the Simple Network Management Protocol (SNMP), specify the information that a network monitoring system is expected to provide. RMON first became a standard in 1992 in Request for Comments (RFC) 1271 of the Internet Engineering Task Force (IETF). It is currently specified as part of the IETF Management Information Base (MIB) in RFC 1757, entitled "Remote Network Monitoring Management Information Base." More recently, RMON Version 2 (sometimes referred to as "RMON2") was specified in IETF RFC 2021. These standard documents are incorporated herein by reference.

RMON can be supported by hardware monitoring devices (known as "probes") and/or by software agents embedded in network nodes and other elements. For example, Cisco's line of LAN switches includes software in each switch that can trap information as traffic flows through the switch and record the information in its MIB. RMON specifies nine kinds of information to be collected by probes and agents, including packets sent, bytes sent, packets dropped, statistics by host and by conversation between two sets of addresses, and certain kinds of events that have occurred. RMON information groups eight and nine are based on trapping or capturing specified types of packets, to provide network alarms and enable traffic decoding and analysis. RMON probes and agents are typically controlled by a management station, using SNMP commands. These SNMP commands are described, for example, in *SNMP, SNMPv2 and RMON: Practical Network Management*, by William Stallings (Second Edition, Addison Wesley, 1996), which is incorporated herein by reference.

Other types of network monitoring tools are also known in the art. For example, Network Associates (Santa Clara, Calif.) offer the "Sniffer" line of network analysis products. The capabilities of these products include packet capturing, whereby filters based on pattern matching and/or Internet Protocol (IP) addresses enable selected frames to be captured and displayed. Further details regarding these products are available at www.sniffer.com. Another tool that is commonly used in diagnosing IP-based routing is TraceRoute, which is described, for example, by Huitema, in *Routing in the Internet* (Prentice Hall, 1995), page 45, which is incorporated herein by reference. TraceRoute is used to determine a network path that an IP packet could traverse from a specific host to reach an intended destination, and to identify possible network problems in this context. It is available as an application in most operating systems that implement IP.

TraceRoute discovers intermediate hops traversed by a packet by adjusting the "Time to Live" (TTL) parameter in each of a sequence of IP packets. It uses the fact that at each hop as the packet passes through the network, the TTL is reduced by one, and an error message is sent by a router that receives an IP packet with a zero TTL. In each packet in the sequence sent from the host, the TTL parameter is incremented by one. TraceRoute monitors the error messages sent back from the routers in the network with respect to each of the packets in turn, and thus tracks the packets downstream progressively until the ultimate destination has been reached. When multiple paths are available in the network, however (as is the case in most large IP networks), there is no assurance that all of the packets in the sequence will follow the same path. In this context, the information provided by TraceRoute is of little use in end-to-end tracking of packets or in determining packet transmission delays over different hops along the route.

U.S. Pat. No. 5,812,529, whose disclosure is incorporated herein by reference, describes a system and method for acquiring network performance data, built around a "mission server," which interfaces with clients to receive requests for "missions." A typical mission includes operations such as transmission and reception of data packets among devices connected to segments of the network. The mission is performed and/or supported by "sentries," typically software agents running on the network devices. The sentries carry out mission operations in response to commands from the mission server, and report back to the mission server on the mission results.

U.S. Pat. Nos. 5,838,919 and 5,881,237, whose disclosures are incorporated herein by reference, describe methods, systems and computer program products for testing of network performance using test scenarios that simulate actual communications traffic between network end-points. Specific test protocols are assigned to end-point nodes on the network. Typically, the nodes are paired, and one of the nodes in the pair communicates the protocol to the other, associated node. A console node sets up the test protocols, initiates their execution and receives data on the test performance from the end-point nodes.

SUMMARY OF THE INVENTION

It is an object of some aspects of the present invention to provide improved methods and apparatus for locating faults within communication networks.

It is another object of some aspects of the present invention to provide improved methods and apparatus for evaluation of the performance of communication networks.

In preferred embodiments of the present invention, a distributed testing system for evaluation and/or testing of a communication network comprises a plurality of capture-capable network agents (CCNAs), which are coupled to the network at different, respective locations and are controlled by a testing center. The CCNAs intercept packets meeting a filtering criterion that is specified by the testing center, and report to the testing center on the arrival of the specified packets. In intercepting the packets, the CCNAs preferably copy the packets "on the fly," without stopping or delaying the packets. By collecting reports from multiple CCNAs that intercept a given packet passing through the network from one end-point to another, the testing center is able to analyze details of the route and timing of the packet within the network, over multiple links and nodes simultaneously. It thus overcomes a shortcoming of network diagnostic systems known in the art, which are largely limited to determining end-to-end information regarding packet transmission.

Preferably, the CCNAs comprise software agents associated with an existing piece of network equipment, such as a switch or router. Alternatively or additionally, CCNAs may comprise stand-alone probes. In either case, the CCNAs typically comprise standard elements, such as RMON agents or probes, which already exist in many networks. The present invention takes advantage of the capabilities of such elements to identify and capture packets meeting the filtering criterion, for example, having a specified bit pattern, address and/or protocol. The CCNAs are directed by the testing center, in accordance with a selected test scenario, to perform functions such as storing all or a part of the specified packets and recording their times of arrival, as well as processing the timing or other information and passing it back to the testing center. While these CCNA functions are within the capabilities of standard, existing agents and probes, the testing center controls the CCNAs and processes the information that they provide in a novel fashion, so as to provide network diagnostic information that is not offered by systems known in the art.

In some preferred embodiments of the present invention, the testing system comprises one or more traffic agents coupled to nodes and/or hosts of the network. The traffic agents act as artificial users of the network by establishing connections and transmitting and receiving packets of data. The testing center instructs one of the traffic agents to send a sequence of packets with a specified identifying feature through the network to a destination agent or host. The testing center instructs the CCNAs to intercept each packet with this feature and to report its times of arrival. Preferably, the destination agent or host echoes the packets back to the original traffic agent, and the CCNAs are instructed to intercept and report on the echoed packets, as well. The testing center processes the information received from each of the CCNAs to determine the exact route of each of the packets through the network and the time elapsed in each link along the route. The route and timing data are preferably used to find specific nodes or links that had slow response and/or high jitter, thus indicating the likely location of network problems.

There is therefore provided, in accordance with a preferred embodiment of the present invention, a method for testing of a communication network having a plurality of end-points, using one or more network agents coupled to the network at respective locations, the method including:

specifying at least one packet filtering criterion;

transmitting one or more data packets meeting the at least one criterion through the network from one of the end-point to another;

intercepting at least one of the data packets meeting the criterion using the network agents at one or more of the respective locations in the network traversed by the at least one of the data packets;

recording information regarding the at least one intercepted packet at the one or more respective locations; and processing the recorded information to analyze a route of the at least one intercepted packet through the network.

Preferably, specifying the at least one packet filtering criterion includes specifying a pattern of data to appear in the one or more packets to be transmitted. Additionally or alternatively, specifying the at least one packet filtering criterion includes specifying information associated with a data protocol in accordance with which the packets are to be transmitted. Preferably, specifying the information associated with the data protocol includes specifying a Transport Control Protocol (TCP) sequence number to be assigned to the one or more packets to be transmitted, wherein the TCP sequence number most preferably includes an acknowledgment sequence number.

Preferably, the plurality of end-points includes a source end-point and a destination end-point, and transmitting the one or more data packets includes transmitting original packets from the source end-point to the destination end-point, and receiving echo packets returned from the destination end-point, both the original and the echo packets meeting the at least one criterion.

In a preferred embodiment, the network agents include Remote Network Monitoring (RMON) elements, in accordance with one or more applicable standards defined by the Internet Engineering Task Force (IETF). Preferably, the network agents include software processes running on nodes of the network at the respective locations. Alternatively or additionally, the network agents include stand-alone probes.

Preferably, recording the information includes recording times of arrival of the at least one intercepted packet at the respective locations, wherein processing the recorded information includes determining, responsive to the times of arrival, transit times of the at least one intercepted packet over network links connected to the respective locations and traversed by the at least one intercepted packet. Most preferably, intercepting the at least one of the data packets includes intercepting multiple data packets, and wherein determining the transit times includes detecting a jitter in transit of the packets over one of the links.

Additionally or alternatively, the plurality of end-points includes a source end-point and a destination end-point, wherein transmitting the one or more data packets includes transmitting original packets from the source end-point to the destination end-point, and receiving corresponding echo packets returned from the destination end-point, both the original and the echo packets meeting the criterion, and wherein determining the transit times includes determining round-trip transit times by intercepting both the original packets and the corresponding echo packets. Most preferably, transmitting the original packets includes transmitting a Transport Control Protocol (TCP) initialization packet having a first, specified TCP sequence number, and receiving the echo packets includes receiving a TCP connection acknowledgment packet having a second TCP sequence number, which is determined responsive to the first TCP sequence number.

In a preferred embodiment, processing the recorded information includes determining which of a plurality of links in the network were traversed by the at least one intercepted packet.

There is also provided, in accordance with a preferred embodiment of the present invention, apparatus for testing of a communication network having a plurality of endpoints and nodes connected by links, including:

one or more network agents, adapted to be coupled to the network at respective locations and to intercept data packets that meet a predetermined packet filtering criterion and traverse the respective locations, and to record information regarding the intercepted data packets; and a testing center, configured to convey the criterion to the network agents and to cause one or more data packets meeting the criterion to be transmitted through the network from one of the end-points to another, and to process the information recorded by the network agents in order to analyze a route of the at least one intercepted packet through the network.

Preferably, the apparatus includes at least one traffic agent, which is configured to receive instructions from the testing center and, responsive thereto, to transmit the packets meeting the criterion from the one of the end-points to the other.

There is further provided, in accordance with a preferred embodiment of the present invention, a computer software product for testing of a communication network having a plurality of end-points, using one or more network agents coupled to the network at respective locations, the product including a computer-readable medium in which program instructions are stored, which instructions, when read by a computer, cause the computer to specify a packet filtering criterion and to engender transmission of one or more data packets meeting the criterion through the network from one of the end-points to another, such that at least one of the data packets meeting the criterion is intercepted using the network agents at the respective locations in the network traversed by the packets, which agents record information regarding the at least one intercepted packet at the respective locations, and which instructions further cause the computer to receive and process the recorded information so as to analyze a route of the at least one intercepted packet through the network.

The present invention will be more fully understood from the following detailed description of the preferred embodiments thereof, taken together with the drawings in which:

DETAILED DESCRIPTION OF PREFERRED EMBODIMENTS

Figure 1:
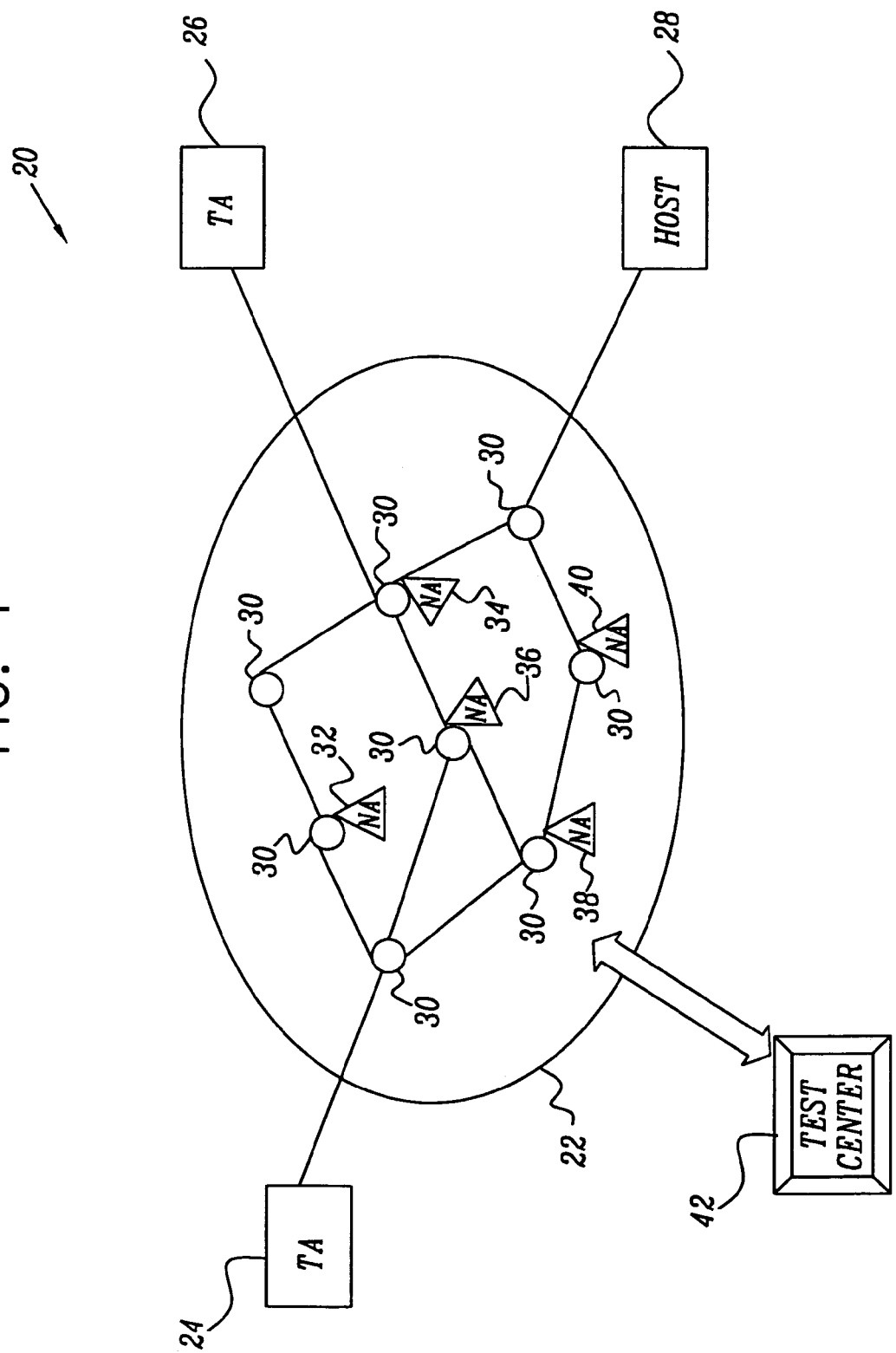
FIG. 1 is a graph that schematically illustrates a communication network to which a distributed testing system is coupled, in accordance with a preferred embodiment of the present invention.

FIG. 1 is a block diagram that schematically illustrates a distributed testing system 20, used to perform diagnostic testing on a network 22, in accordance with a preferred embodiment of the present invention. Network 22 may comprise substantially any network known in the art that is capable of transmitting data packets, such as a local- or wide-area network (LAN or WAN), a public switched telephone network (PSTN), the Internet or an intranet, an asynchronous transfer mode (ATM) network, an optical or wireless network, or some combination of these different types. The network comprises switching and routing hardware, represented schematically in FIG. 1 as nodes 30.

Testing system 20 comprises one or more end-point traffic agents 24, 26, which are coupled to ports of network 22. Typically, multiple host computers, such as a host 28, are also connected to and make use of the network. Preferably, the traffic agents serve as both traffic generators, transmitting packets through the network, and as traffic analyzers, receiving packets and assembling information regarding the received packets, as described in detail hereinbelow. Traffic agents 24 and 26 are typically implemented as software processes running on host computers connected to the network. Alternatively, some or all of these hosts may comprise add-on hardware devices to accommodate the traffic agents, particularly when network 22 is a very fast network, such as an ATM or a Gigabit Ethernet network. Further alternatively or additionally, the traffic agents may be implemented as stand-alone devices, independent of host computers. Although only two traffic agents are shown in FIG. 1, system 20 may comprise substantially any reasonable number of agents.

Testing system 20 also comprises capture-capable network agents (CCNAs) 32, 34, 36, 38, 40 (also referred to herein simply as network agents, and marked "NA" for short in FIG. 1). As shown in the figure, these CCNAs typically comprise software agents or combinations of hardware and software elements that are associated with one or more of nodes 30. Alternatively, the CCNAs may comprise stand-alone probes, coupled to the network at nodes 30 or at locations along network links intermediate the nodes. The CCNAs are characterized by an ability to intercept, or capture, specified types of packets that pass through the nodes or links to which they are coupled. Preferably, the type of packet to intercept is specified in terms of a filtering criterion, such as a certain bit pattern occurring in the packets. Most preferably, the pattern is defined in a manner that allows variations, using methods such as "wild cards" and "don't care" entries, as are known in the art of string matching. Alternatively or additionally, the packet type is specified in terms of a protocol or packet address, or substantially any other distinguishing packet characteristic.

When one of the CCNAs intercepts a packet of the specified type, it preferably records the time of interception and, optionally, stores all or a specified portion or characteristic of the packet. Typically, in a given test scenario, a CCNA intercepts multiple packets of the specified type or types. In this case, the CCNA may store all of the packets or portions thereof, or alternatively, it may record only certain parameters or a combination of parameters, such as the numbers and times of arrivals of the packets, the sizes of the packets, or the values of certain fields in the packets. Most preferably, the CCNA also processes the information that it collects in the course of a test and provides a summary.

Preferably, the CCNAs comprise RMON agents or probes, as specified by the above-mentioned IETF standards. Alternatively or additionally, the CCNAs may comprise other types of network traffic analyzers known in the art, such as the above-mentioned "Sniffer" analyzers. Further alternatively, the CCNAs may comprise dedicated devices or software agents for carrying out the test methods described hereinbelow. Substantially any type of network agent or probe may be used in the context of the present invention, so long as it has the requisite packet interception and reporting capabilities. Although FIG. 1 shows a network of low complexity, so that system 20 includes relatively few CCNAs, the principles of the present invention are equally applicable to networks of greater size and complexity, for which test systems with greater numbers of CCNAs are typically used.

System 20 further includes a testing center 42, which is preferably implemented as a software process executed at a network management host. The host of testing center 42 preferably comprises a graphical workstation or a personal computer. The software for the testing center, as well as software for carrying out the functions of the traffic agents and CCNAs, is typically conveyed to the respective computers via network 22. Alternatively, the software may be supplied on tangible media, such as CD-ROM or non-volatile memory, for installation on the respective computers. Preferably, testing center 42 communicates through network 22 with traffic agents 24 and 26, as well as with CCNAs 32–40. Alternatively or additionally, different communication apparatus, independent of network 22, such as modem dialup lines or Internet connections, are used to communicate with some or all of the traffic agents and/or CCNAs.

Testing center 42 preferably conducts tests by transmitting one or more commands to at least one of the traffic agents and CCNAs, and subsequently receiving reports from the agents. Preferably, testing center 42 processes the reports, evaluates network 22 based on the reports and displays test results to a network operator. The tests may be initiated by the operator, or they may be carried out automatically by the testing center on a predetermined schedule or when a fault condition is suspected. When the tests are carried out automatically, and a fault condition is detected, the testing center preferably generates an alarm, so as to notify the operator that a fault has occurred. Further aspects of testing system 20 are described in U.S. patent application Ser. No. 09/164,488, and in another U.S. patent application entitled, "Analysis of Network Performance," filed Apr. 24, 2000. Both of these applications are assigned to the assignee of the present patent application, and their disclosures are incorporated herein by reference.

Figure 2:
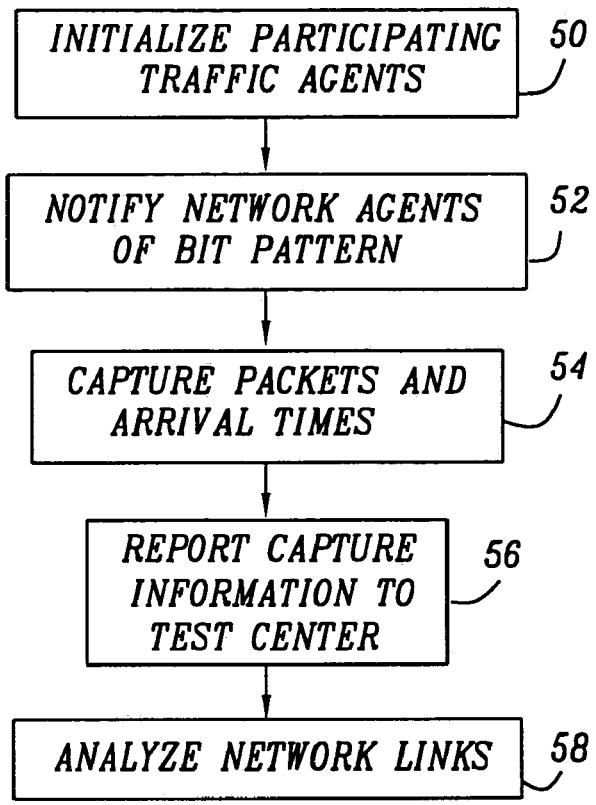
FIG. 2 is a flow chart that schematically illustrates a method for analyzing transit times of packets over links in a communication network, in accordance with a preferred embodiment of the present invention.

FIG. 2 is a flow chart that schematically illustrates a method for testing of packet transmission through network 22, in accordance with a preferred embodiment of the present invention. This method makes use of traffic agents 24 and 26 and of CCNAs 32, 34, 36, 38, 40. All of these elements are capable of carryout out their functions in the context of this testing method substantially without interrupting normal service to network users.

At an initialization step 50, testing center 42 instructs traffic agent 24 to send packets to traffic agent 26 having a certain, specified bit pattern. Traffic agent 26 is instructed to respond by returning echo packets with the same specified bit pattern, or with another specified bit pattern, back to traffic agent 24. Each packet is also preferably identified by a packet serial number, used by both of the traffic agents, in order to associate each packet returned by traffic agent 26 with the original packet from traffic agent 24 that it is echoing. At a CCNA notification step 52, testing center 42 informs the CCNAs of the bit pattern that is to be included in the packets sent by traffic agents 24 and 26. The CCNAs are instructed to intercept all packets having the specified bit pattern or patterns, and to record their respective times of arrival. At a packet capture step 54, the test agents begin transmitting packets, and the CCNAs intercept them as instructed. A typical record of an intercepted packet is shown by way of example in Table I:

TABLE I

PACKET TRANSIT TIMES (MS)

|  | Traffic agent 24 | CCNA 36 | CCNA 34 | Traffic agent 26 |
|---|---|---|---|---|
| Transmitted packet | 0 | 20 | 90 | 100 |
| Echo packet | 200 | 180 | 110 | 100 |
| Round trip | 200 | 160 | 20 | 0 |

At the conclusion of the test or a portion thereof, typically after a certain, specified number of packets have been transmitted and recorded, the traffic agents and CCNA report the test results to testing center 42, at a test reporting step 56. The reported results may comprise raw results, as shown in the table above, or alternatively or additionally, the test agents and CCNAs may provide a summary report and representative statistics. The testing center then analyzes the results, at a link analysis step 58, to find links or subnets in network 22 that may be faulty.

In the specific example of Table I, traffic agent 24 reports that the packet round-trip time to traffic agent 26 is 200 ms. (The time required for agent 26 to respond has been neglected for simplicity.) CCNA 36 reports a 20 ms delay in receiving the packet from traffic agent 24. CCNA 34 reports a 70 ms delay, and traffic agent 26 reports a 10 ms delay. Testing center 42 concludes that the fault responsible for the slow response in transmissions between traffic agent 24 and 26 is in the link between CCNAs 34 and 36.

In actual networks, the times of arrival and transmission of the packets will not be as orderly as those shown in Table I. In large, distributed networks, such as the Internet, for example, the clocks operating at the different nodes 30 are not generally synchronized. Therefore, the packet interception times read by the different CCNAs cannot be directly compared with one another, and it is not possible to measure transmission delays accurately in a one-way transmission of a packet. For this reason, the round-trip travel time shown in the last row of the table is useful, as it inherently cancels out the effect of the lack of clock synchronization. The round-trip time shown in each column gives the exact round-trip time of the packet between the respective CCNA and traffic agent 26, referred only to the respective clock of the CCNA. The individual link times can then be determined by simple arithmetic.

Another aspect of actual networks not shown by Table I is packet-to-packet jitter, wherein the transit times of successive packets over a given link typically vary. Furthermore, in many networks, such as Internet Protocol (IP) networks, successive packets between the same end-points may be sent over different routes, through different nodes. A summary of the results of the test shown in FIG. 2 preferably shows the numbers of packets sent through each of the relevant CCNAs in system 20, together with the respective transmission delays and jitter. Jitter in one of the links will lead to comparable jitter in the total transit time between traffic agents 24 and 26. The test of FIG. 2 enables test center 42 to determine which of the links is responsible for the jitter.

Still another feature of testing network 22 using the method of FIG. 2 is the ability to track packets through the network. For each packet, only those CCNAs along the packet's route are able to capture it. Thus, the route of an individual packet can be determined by observing which CCNAs intercepted the packet and at what respective delays. This procedure thus provides the exact route of the packet, rather than the uncertain and possibly inaccurate information provided by TraceRoute (as described in the Background of the Invention.) Similarly, if the summary report conveyed to testing center 42 shows that very few or no packets traversed one of the CCNAs, such as CCNA 40, it can be concluded that the corresponding network link is being underused. This can lead to excessive traffic and jitter on the alternative links. On the other hand, the summary report may show excessive routing diversity, i.e., too many different routes being used, which can be indicative of routing problems in some networks, such as IP networks.

Figure 3:
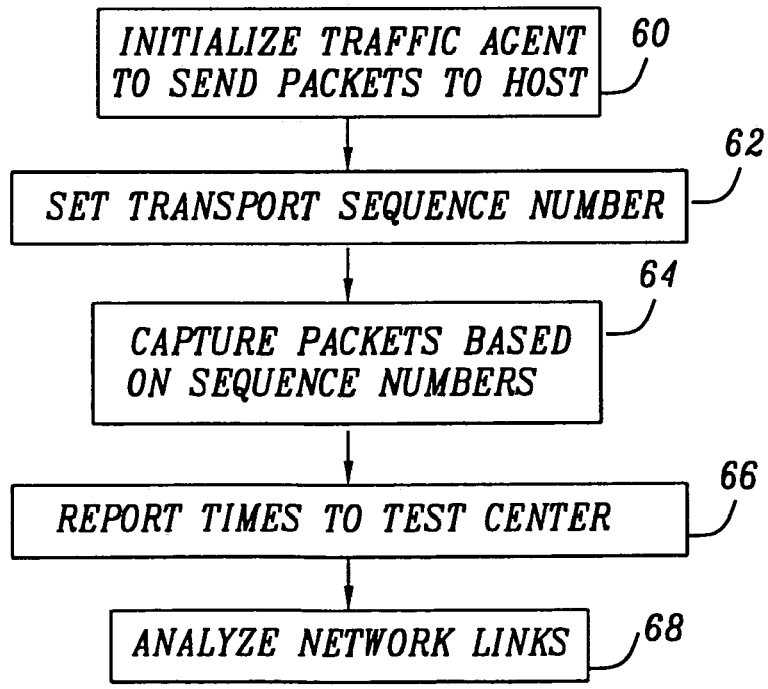
FIG. 3 is a flow chart that schematically illustrates a method for analyzing transit times of packets over links in a communication network, in accordance with another preferred embodiment of the present invention.

FIG. 3 is a flow chart that schematically illustrates another method for testing packet transmission through network 22, in accordance with a preferred embodiment of the present invention. This method is similar to that shown in FIG. 2, except that in this case, packets are transmitted between traffic agent 24 and host 28, which is not a traffic agent and therefore cannot be programmed by testing center 42. Hence, at an initialization step 60, the testing center initializes only traffic agent 24, instructing the traffic agent to transmit packets to host 28. The host cannot be made to return echo packets containing a predetermined bit pattern, as in the embodiment of FIG. 2. Instead, system 20 takes advantage of features of standard communication protocols that enable the CCNAs to recognize and intercept the echo packets, as well as the original packets transmitted by the traffic agent. Testing center 42 instructs traffic agent 24 to send packets using one of these features.

For example, in some protocols, such as the Transport Control Protocol (TCP), every packet carries a protocol sequence number, which is initialized to an arbitrary value by the host initiating a communication. The sequence number acknowledged by the echo packet is given simply by incrementing the number of the original packet by one. Thus, at a sequence number setting step 62, traffic agent 24 is instructed to send packets to host 28 with certain TCP sequence numbers. Each packet will be echoed by the host with a TCP acknowledgment sequence number incremented by one. The testing center instructs the CCNAs to intercept the packets having the appropriate, predetermined TCP sequence numbers in the appropriate header fields. Other packet features may be used as additional filtering parameters if desired. The CCNAs intercept the packets by their sequence numbers at a packet capture step 64. A reporting step 66 and an analyzing step 68 are then carried out in similar fashion to their counterparts in FIG. 2 (except that there is no report from traffic agent 26).

While preferred embodiments are described herein for the most part with reference to tests involving transmission of packets between a pair of network end-points, the principles of the present invention can also be applied in more complex test scenarios. For example, multiple traffic agents may send packets simultaneously or sequentially, so as to put pressure on a particular network link. As another example, the CCNAs may be configured to intercept packets having a known pattern that is generated by a particular application, in which case no dedicated traffic agents are required. All such variations are considered to be within the scope of the present invention.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for testing of a communication network having a plurality of end-points, using one or more network agents coupled to the network at respective locations, the method comprising:

specifying at least one packet filtering criterion;

transmitting one or more data packets meeting the at least one criterion through the network from one of the end-points to another;

intercepting at least one of the data packets meeting the criterion using the network agents at one or more of the respective locations in the network, intermediate the end-points, traversed by the at least one of the data packets;

recording a time of arrival of the at least one intercepted packet at the one or more respective locations; and processing the recorded information to analyze a route of the at least one intercepted packet through the network, wherein processing the recorded information comprises determining, responsive to the time of arrival, transit times of the at least one intercepted packet over network links connected to the respective locations and traversed by the at least one intercepted packet, and wherein the plurality of end-points comprises a source end-point and a destination end-point, and wherein transmitting the one or more data packets comprises transmitting original packets from the source end-point to the destination end-point, and receiving corresponding echo packets returned from the destination end-point, both the original and the echo packets meeting the criterion, and wherein determining the transit times comprises determining round-trip transit times by intercepting both the original packets and the corresponding echo packets.

2. A method according to claim 1, wherein specifying the at least one packet filtering criterion comprises specifying a pattern of data to appear in the one or more packets to be transmitted.

3. A method according to claim 1, wherein specifying the at least one packet filtering criterion comprises specifying information associated with a data protocol in accordance with which the packets are to be transmitted.

4. A method according to claim 3, wherein specifying the information associated with the data protocol comprises specifying a Transport Control Protocol (TCP) sequence number to be assigned to the one or more packets to be transmitted.

5. A method according to claim 4, wherein the TCP sequence number comprises an acknowledgment sequence number.

6. A method according to claim 1, wherein the plurality of end-points comprises a source end-point and a destination end-point, and
wherein transmitting the one or more data packets comprises transmitting original packets from the source end-point to the destination end-point, and receiving echo packets returned from the destination end-point, both the original and the echo packets meeting the at least one criterion.

7. A method according to claim 1, wherein the network agents comprise Remote Network Monitoring (RMON) elements, in accordance with one or more applicable standards defined by the Internet Engineering Task Force (IETF).

8. A method according to claim 1, wherein the network agents comprise software processes running on nodes of the network at the respective locations.

9. A method according to claim 1, wherein the network agents comprise stand-alone probes.

10. A method according to claim 1, wherein intercepting the at least one of the data packets comprises intercepting multiple data packets, and wherein determining the transit times comprises detecting a jitter in transit of the packets over one of the links.

11. A method according to claim 1, wherein transmitting the original packets comprises transmitting a Transport Control Protocol (TCP) initialization packet having a first, specified TCP sequence number, and
wherein receiving the echo packets comprises receiving a TCP connection acknowledgment packet having a second TCP sequence number, which is determined responsive to the first TCP sequence number.

12. A method according to claim 1, wherein processing the recorded information comprises determining which of a plurality of links in the network were traversed by the at least one intercepted packet.

13. Apparatus for testing of a communication network having a plurality of endpoints and nodes connected by links, comprising:
one or more network agents, adapted to be coupled to the network at respective locations intermediate the end-points and to intercept data packets transmitted from one of the end-points to another that meet a predetermined packet filtering criterion and traverse the respective locations, and to record times of arrival of the intercepted data packets; and
a testing center, configured to convey the criterion to the network agents and to cause one or more data packets meeting the criterion to be transmitted through the network from one of the end-points to another, and to process the information recorded by the network agents in order to analyze a route of the at least one intercepted packet through the network,
wherein the testing center is operative to determine, responsive to the recorded times of arrival, transit times of the at least one intercepted packet over the network links connected to the respective locations and traversed by the at least one intercepted packet, and
wherein the determined transit times comprise round-trip transit times, determined by transmitting original packets from a source end-point to a destination end-point, and receiving corresponding echo packets returned from the destination end-point responsive to the original packets, both the original and the echo packets meeting the criterion, and
wherein both the original packets and the corresponding echo packets are intercepted by the one or more network agents.

14. Apparatus according to claim 13, and comprising at least one traffic agent, which is configured to receive instructions from the testing center and, responsive thereto, to transmit the packets meeting the criterion from the one of the end-points to the other.

15. Apparatus according to claim 14, wherein the packet filtering criterion comprises a pattern of data that is included in the packets transmitted by the at least one traffic agent.

16. Apparatus according to claim 15, wherein the at least one traffic agent comprises first and second traffic agents at respective network endpoints, and
wherein responsive to receiving one of the packets with the pattern of data transmitted by the first traffic agent, the second traffic agent returns a data packet comprising the pattern of data to the first traffic agent.

17. Apparatus according to claim 14, wherein the packet filtering criterion comprises information associated with a data protocol in accordance with which the traffic agent transmits the packets.

18. Apparatus according to claim 17, wherein the information associated with the data protocol comprises a Transport Control Protocol (TCP) sequence number used by the at least one traffic agent.

19. Apparatus according to claim 13, wherein the plurality of end-points comprises a source end-point and a destination end-point, and wherein the one or more data packets meeting the criterion comprise original packets sent from the source end-point to the destination end-point and echo packets returned from the destination end-point responsive to the original packets, both the original and the echo packets meeting the criterion.

20. Apparatus according to claim 13, wherein the network agents comprise Remote Network Monitoring (RMON) elements, in accordance with one or more applicable standards defined by the Internet Engineering Task Force (IETF).

21. Apparatus according to claim 13, wherein the network agents comprise software processes running on the nodes of the network at the respective locations.

22. Apparatus according to claim 13, wherein the network agents comprise stand-alone probes.

23. Apparatus according to claim 13, wherein the one or more network agents are operative to intercept multiple data packets, and wherein the testing center is adapted to detect a jitter in transit of the packets over one of the links.

24. Apparatus according to claim 13, wherein the testing center is operative to determine which of the links in the network were traversed by the at least one intercepted packet.

25. A computer software product for testing of a communication network having a plurality of end-points, using one or more network agents coupled to the network at respective locations, the product comprising a computer-readable medium in which program instructions are stored, which instructions, when read by a computer, cause the computer to specify a packet filtering criterion and to engender transmission of one or more data packets meeting the criterion through the network from one of the end-points to another, such that at least one of the data packets meeting the criterion is intercepted using the network agents at the respective locations in the network, intermediate the end-points, traversed by the packets, which agents record a time of arrival of the at least one intercepted packet at the respective locations, and which instructions further cause the computer to receive and process the recorded information so as to analyze a route of the at least one intercepted packet through the network, wherein the instructions cause the computer to determine, responsive to the recorded times of arrival, transit times of the at least one intercepted packet over the network links connected to the respective locations and traversed by the at least one intercepted packet, and wherein the determined transit times comprise round-trip transit times, determined by transmitting original packets from a source end-point to a destination end-point, and receiving corresponding echo packets returned from the destination end-point responsive to the original packets, both the original and the echo packets meeting the criterion, and wherein both the original packets and the corresponding echo packets are intercepted by the one or more network agents.

\* \* \* \* \*